United States Patent [19]

Bartus

[11] Patent Number: 5,562,011
[45] Date of Patent: Oct. 8, 1996

[54] CAM ACTUATED SINGLE RAIL MANUAL TRANSMISSION

[75] Inventor: John V. Bartus, Livonia, Mich.

[73] Assignee: Ford Motor Company, Dearborn, Mich.

[21] Appl. No.: 418,224

[22] Filed: Apr. 6, 1995

[51] Int. Cl.⁶ .................. F16H 3/38; G05G 5/06
[52] U.S. Cl. .............. 74/473 R; 74/475; 74/477
[58] Field of Search ................ 74/477, 473 R, 74/475

[56] References Cited

U.S. PATENT DOCUMENTS

| 4,222,281 | 9/1980 | Mylenek. |
|---|---|---|
| 4,338,828 | 7/1982 | Ruhlman. |
| 4,532,823 | 8/1985 | Razzacki. |
| 4,601,214 | 7/1986 | Fukuchi. |
| 5,285,694 | 2/1994 | Chene. |
| 5,291,799 | 3/1994 | Seaman. |
| 5,309,782 | 5/1994 | Seaman. |
| 5,357,823 | 10/1994 | Parsons. |

Primary Examiner—Charles A. Marmor
Assistant Examiner—Troy Grabow
Attorney, Agent, or Firm—James J. Dottavio

[57] ABSTRACT

A multiple speed manual transmission shift mechanism mounted within a transmission housing, including a shift rail (10), a control tube (14) which is coaxial with said shift rail (10), a plurality of shift forks (16) supported for translation by said control tube (14), where the shift forks (16) are prevented from translating due to deflectable pins (20), and the control tube (14) may selectively disable the pins (20) to allow translation of the shift forks (16).

13 Claims, 5 Drawing Sheets

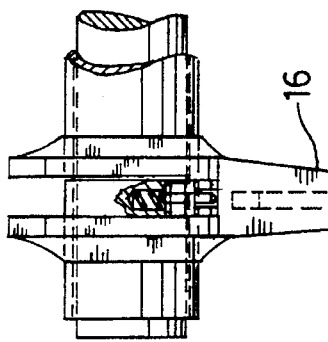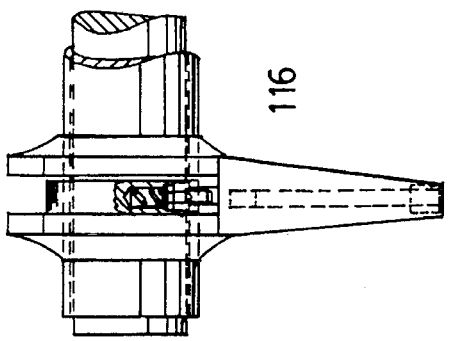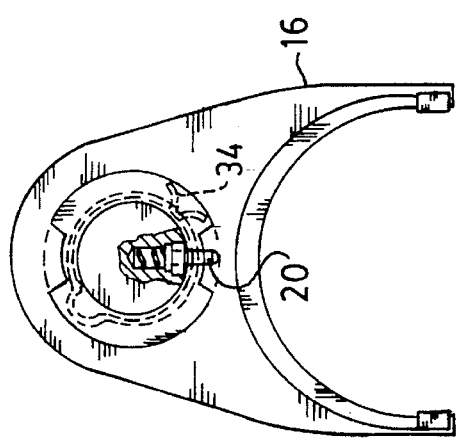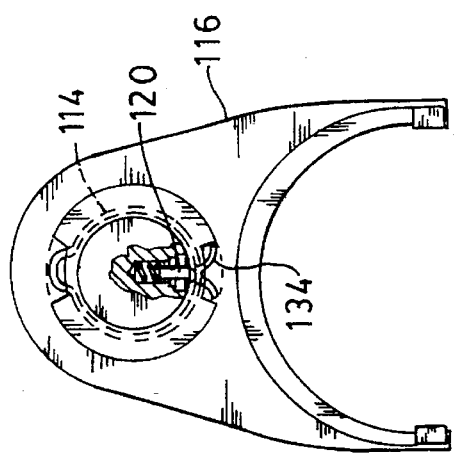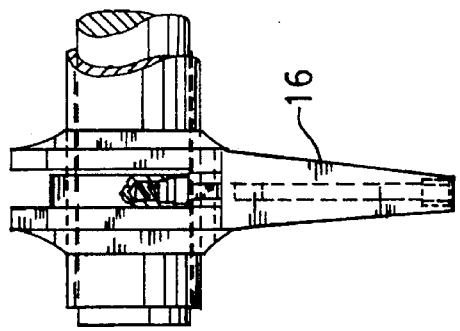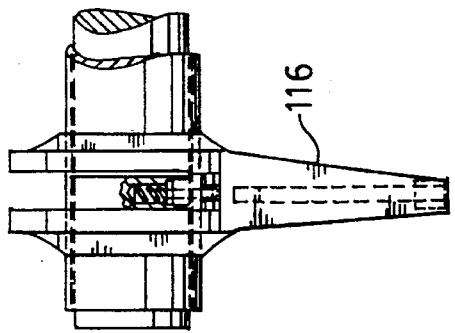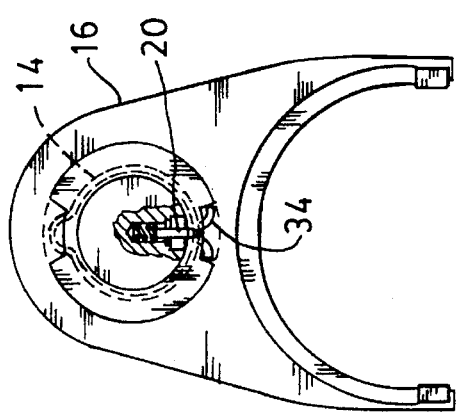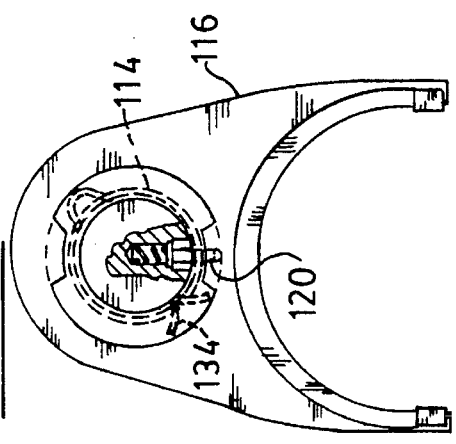

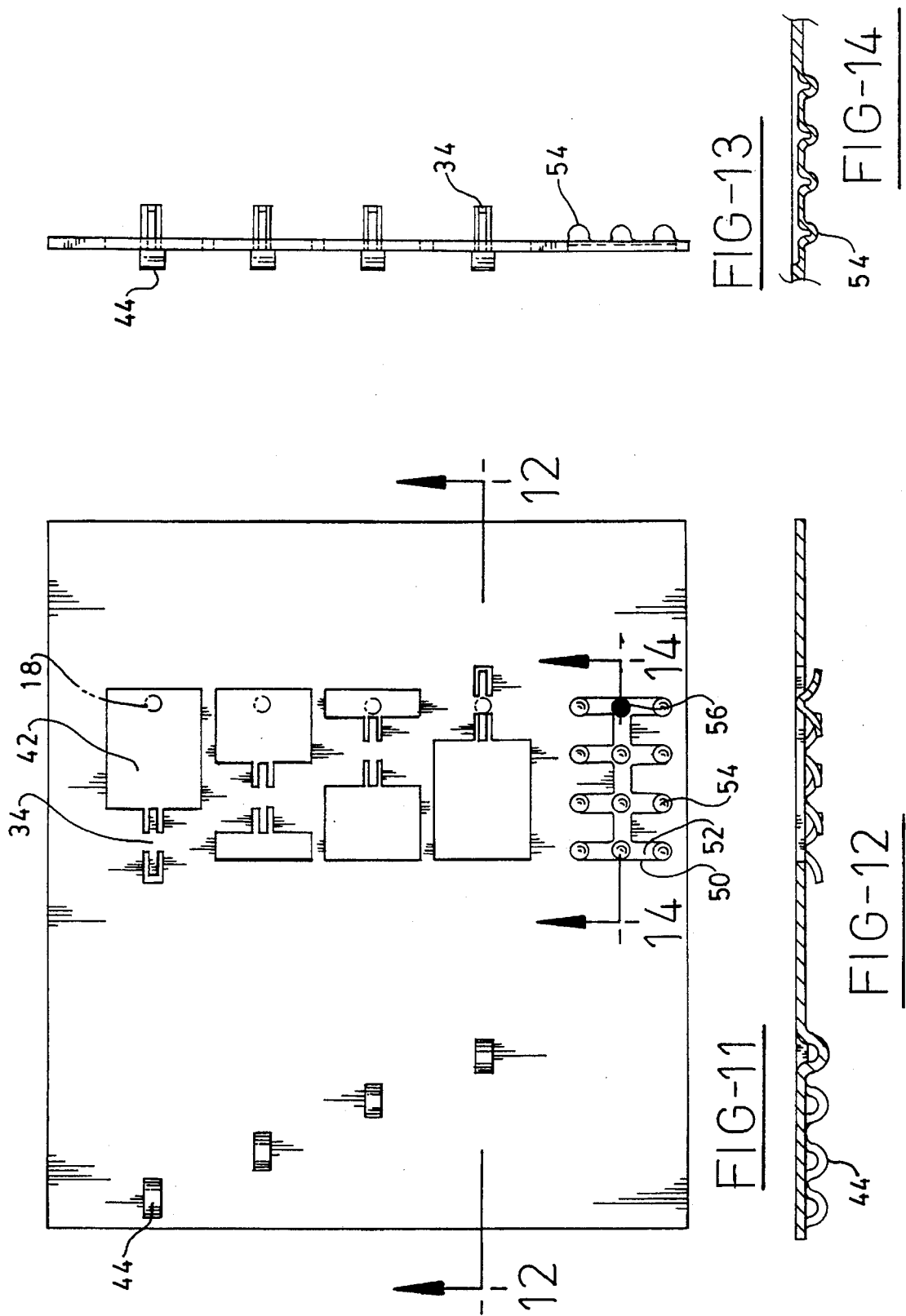

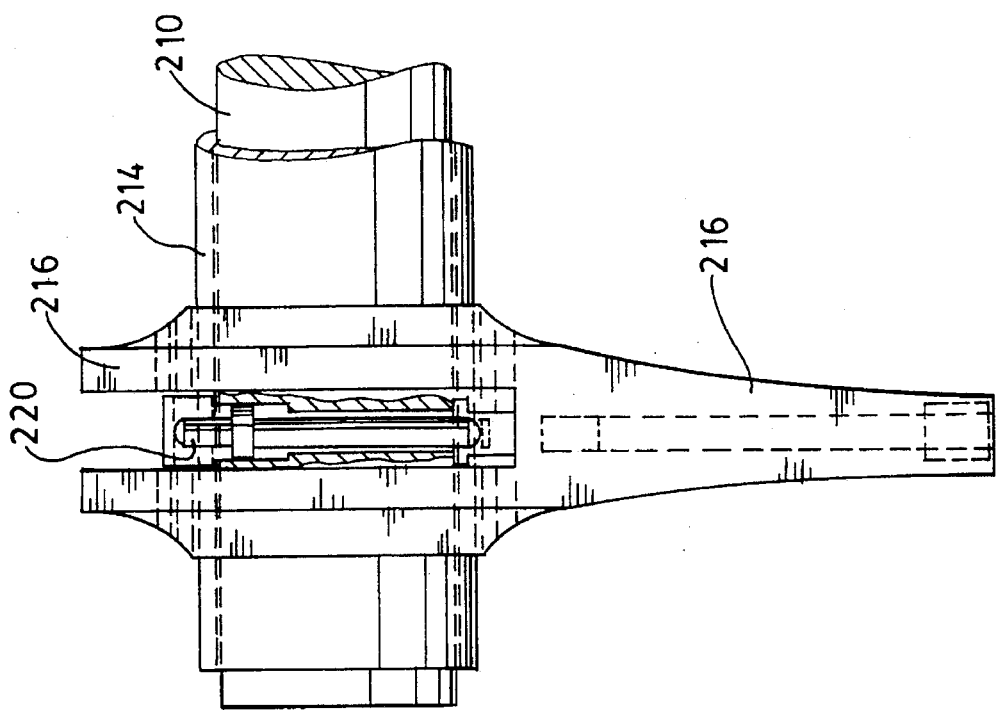
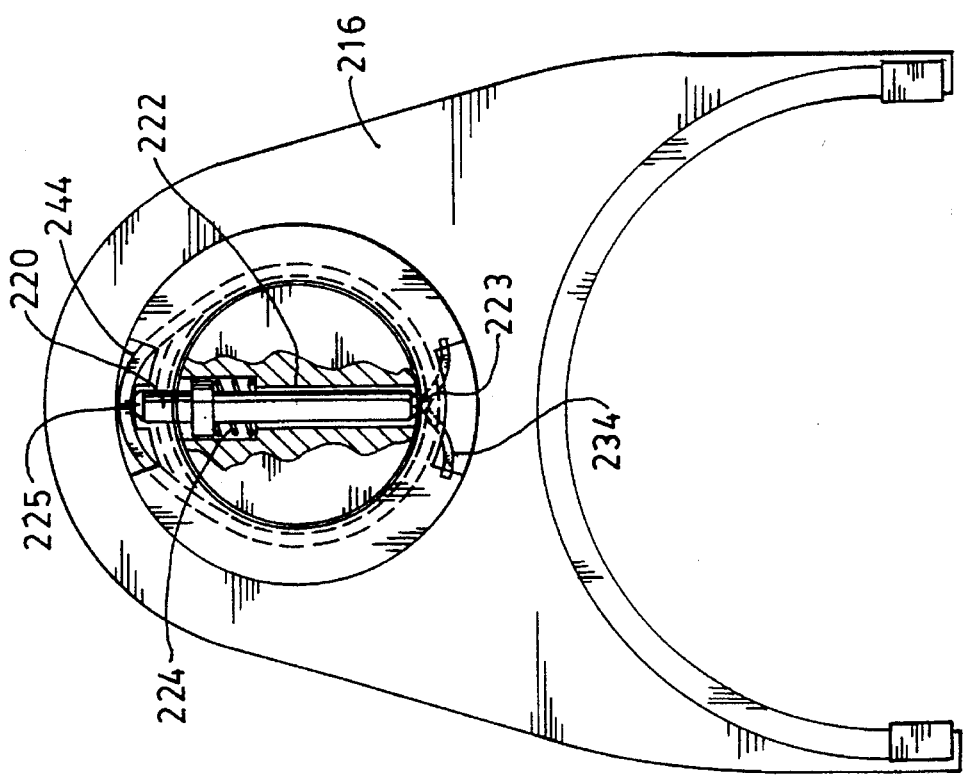

CAM ACTUATED SINGLE RAIL MANUAL TRANSMISSION

BACKGROUND OF THE INVENTION

1. Field of the Invention

The present invention relates to a manual transmission for motor vehicles. More particularly, this invention relates to a shift rail mechanism in a multiple gear automotive manual transmission.

2. Description of the Prior Art

This invention comprises a manual transmission assembly having a shift rail and multiple gearing for use with an internal combustion vehicle engine. An example of a transmission presently known in the prior art is illustrated in U.S. Pat. No. 4,222,281 ('281), assigned to the assignee of the present application. In the '281 patent, the shifting mechanism comprises a single shift rail and shift lever assembly for actuating synchronizer clutch mechanisms, including a first motion reversing lever assembly establishing a connection between the single shift rail and the synchronizer clutch mechanism for third and fourth ratio changes and another lever assembly for reversing the motion imparted to a reverse drive pinion by the single shift rail; the reverse drive pinion being shiftable to a driving position or to an inoperative position and the synchronizer clutch mechanism for the first and second speed ratio changes including an integral main drive gear that forms a part of the reverse torque delivery path.

A second example of a single rail shift mechanism for a manual transmission is shown in U.S. Pat. No. 4,532,823 ('823), to Razzacki. In the '823 patent, the shift rail assembly has a single shift rod slidably received within an outer concentric tubular member. A first-second (1–2) speed fork is supported on the tubular member for movement therewith. A third-fourth (3–4) speed fork is slidably supported on the tubular shift rail for axial movement relative thereto. A fifth speed fork is fixedly retained on one free end of the shift rod. The tubular member has a pair of diametrically opposed elongated control slots receiving a transverse cross pin which extends from the fifth speed shifter through the tubular member and rod. Journal bearings are provided between the outer tubular member and the inner shift rod. This arrangement enables the 1–2 speed fork having the highest shifting resistance, to be readily shifted on the journalled tubular member in a predetermined manner reducing gear shift lever operating efforts.

The prior art single rail shift mechanisms provided several complex moving parts to enable gear selection. For example, the transmission of the '281 patent includes shift levers to effectuate gear selections. The transmission of the '823 patent requires relative movement of the shift rod, the tubular rail., and the 3–4 shift member to the tubular rail in order to effectuate shifts into 1, 3, or 5th gear. Additionally, the selector of the shift mechanism of the '823 patent has a finger which must engage the fork notches. It is unclear to applicant how this is accomplished in the '823 patent without alignment problems during operation of the '823 transmission. Finally, the '823 patent only teaches selection of 1st–5th gears.

SUMMARY OF THE INVENTION

It is an object of the present invention to provide an improved shift rail mechanism with fewer parts, modularity of design, and easy adjustment of shift efforts. A further object of the present invention is to improve and simplify alignment of the gear selection mechanism.

An advantage of the present invention is that all of the shift forks may be identical, as may the components related with the means for preventing translation of the shift forks. Another advantage of the present invention is the number of shift forks may be simply increased or decreased in a modular manner (thereby allowing easier change in the number of gears in the transmission). Another advantage is that shift efforts may be easily changed by simple revisions to the components.

A shift mechanism according to the present invention includes a shift rail with a control tube coaxially disposed about the shift rail. The invention further provides a plurality of shift forks, supported by said control tube for translation relative to said shift rail. The shift rail includes means for preventing translation of said shift forks, and said control tube includes a means for overcoming said means for preventing translation of said shift forks to allow translation of said forks. Finally, said control tube includes means for translating said shift forks.

BRIEF DESCRIPTION OF THE DRAWINGS

FIG. 3 is a partial cross sectional front view of the shift fork, shift rail, and control tube of FIG. 1; the control tube is shown rotated to a position for the shift fork to be translated.

FIG. 4 is a partial cross sectional side view of the shift fork, shift rail, and control tube of FIG. 1; the control tube is shown rotated to a position for the shift fork to be translated.

FIG. 5 is a partial cross sectional front view of the shift fork, shift rail, and control tube of FIG. 3; the control tube is shown rotated to a second position from that shown in FIG. 3 wherein the shift fork is not to be translated.

FIG. 6 is a partial cross sectional side view of the shift fork, shift rail, and control tube of FIG. 4; the control tube is shown rotated to a second position from that shown in FIG. 4 wherein the shift fork is not to be translated.

FIG. 7 is a second partial cross sectional side view of the shift rail and control tube of FIG. 3, at a second shift fork other than the fork shown in FIG. 3; the control tube is shown in the same position as FIG. 3, but the second shift fork is not to be translated.

FIG. 8 is a second partial cross sectional front view of the shift rail and control tube of FIG. 4, at a second shift fork other than the fork shown in FIG. 4; the control tube is shown in the same position as FIG. 4, but the second the shift fork is not to be translated.

FIG. 9 is a second partial cross sectional side view of the shift rail and control tube of FIG. 7, at the second shift fork shown in FIG. 7; the control tube is now shown in the same position as FIG. 5, but the second shift fork may now be translated.

FIG. 10 is a second partial cross sectional side view of the shift rail and control tube of FIG. 8, at the second shift fork shown in FIG. 8; the control tube is now shown in the same position as FIG. 6, but the second shift fork may now be translated.

FIG. 11 is a plan view of the control tube of FIG. 1 prior to being rolled to a tubular form.

FIG. 12 is a sectional view of the control tube of FIG. 11, taken through one of the cams on the tube.

FIG. 13 is a side view of the control tube of FIG. 11 prior to being rolled to a tubular form, after the cams, detents and ramps are formed.

FIG. 14 is sectional view of the control tube of FIG. 11 taken through the detents on the tube.

FIG. 20 is an alternate embodiment of the shift rail shown in FIG. 1.

FIG. 21 is a side view of the shift rail shown in FIG. 20.

DETAILED DESCRIPTION OF THE PREFERRED EMBODIMENTS

Figure 1:
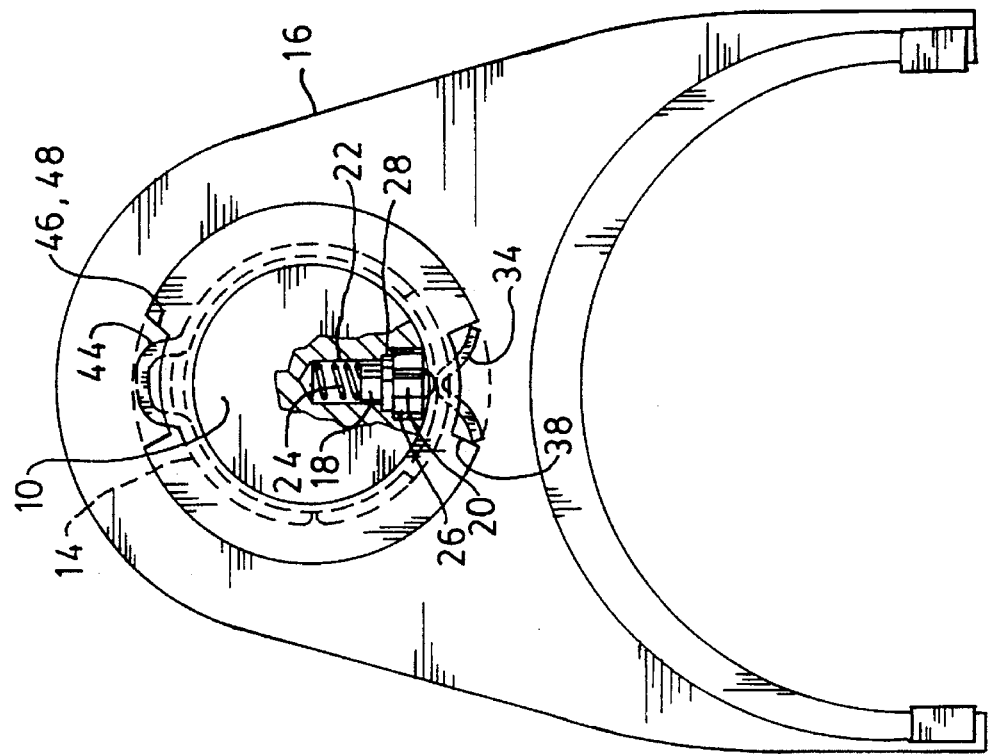
FIG. 1 is a partial cross sectional front view showing a shift fork, shift rail, and control tube according to this invention; the shift fork being shown in a translatable position.

Referring to FIG. 1, a manual transmission shift rail assembly, to which the present invention can be applied, includes a shift rail 10, which is mounted within and supported by a transmission housing (not shown). In the preferred embodiment, the shift rail is fixedly mounted to the transmission housing against translation or rotation. Also shown in FIG. 1 is a control tube 14, which is mounted coaxially about said shift rail 10. The control tube 14 may be rotated about, or translated relative to the shift rail 10. A shift fork 16 is also shown in FIG. 1, mounted coaxial with the control tube 14. The shift fork 16 may be translated axially parallel to the shift rail. As the shift fork 16 is moved axially, it moves a synchronizer (not shown) to engage a gear (not shown) as is well known in the art. As is also known in the art, one shift fork 16 is provided for each synchronizer (not shown). In the present invention, three shift forks are provided to effect 1/2, 3/4 and 5/reverse gear shifts, as taught in U.S. Pat. No. 4,222,281 to Mylenek, assigned to the assignee of this invention, which is incorporated herein for the relevant teachings therein.

Figure 2:
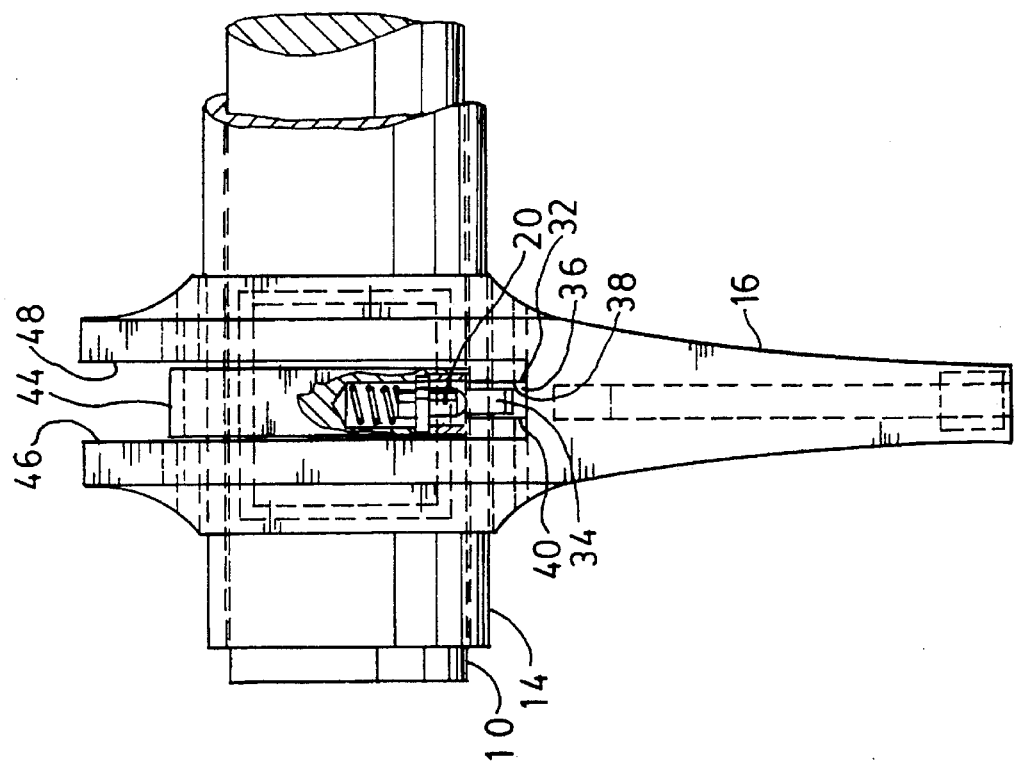
FIG. 2 is a partial cross sectional side view showing the shift fork, shift rail, and control tube of FIG. 1; the shift fork being shown in a translatable position.
Figure 18:
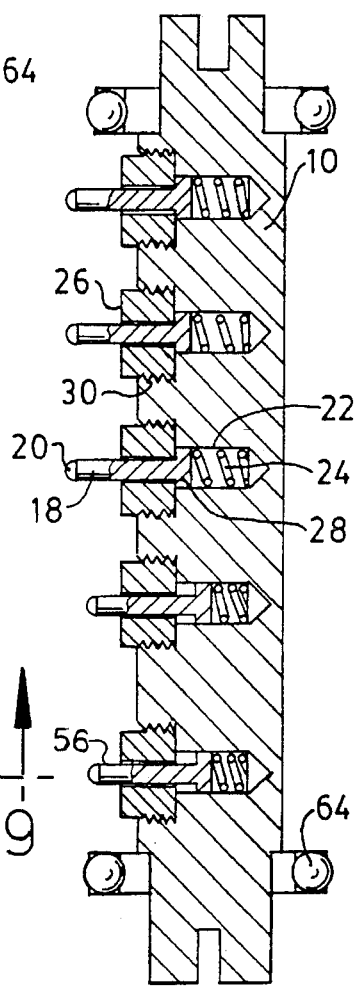
FIG. 18 is a sectional side view of the control rail shown in FIG. 1.

In the preferred embodiment as shown in FIG. 18, the shift rail 10 also includes a plurality of spring loaded pin assemblies 18 which serve as a means to prevent translation of said shift forks 16. Each of the pin assemblies 18 comprises a pin 20, mounted in the shift rail 10 within a radial hole 22 provided in the shift rail 10. Alternatives to said pins 20 include balls, or any equivalent design, as are known in the art. In the preferred embodiment, a resilient means, such as a spring 24 is provided within the hole 22 to urge the pin 20 radially out of the hole 22. However, any equivalent means may be provided to urge the pins 20 out of the hole 22. In the preferred embodiment, the pin 20 is retained within the hole 22 by a collar 26, which engages a flange 28 provided on the pin 20. The flange 28 may be positioned at one end of the pin 20 as shown in FIG. 18, or near the center of the length of the pin 20, as illustrated in FIG. 2. In the preferred embodiment, the hole 22 is threaded at one end 30, and the collar 26 is threaded into the hole 22. However, the collar may be retained by any means known in the art, such as press fit, welding, or adhesives. Additionally, it is not necessary to provide a separate means to retain the pin 20, as this may be accomplished by using a surface 32 on the shift fork 16 shown in FIG. 2, but the collar and flange are provided in the preferred embodiment to facilitate assembly and prevent noise during use of the transmission.

When the pin 20 is depressed as shown in FIG. 1, the shift fork 16 is no longer engaged with the pin 20, and the pin is thereby disabled from preventing translation of the shift fork 16. As shown in FIG. 1, the ramp 34 depresses the pin 20 below the wall 38 of the slot 36 on the shift fork 16, and thereby provides clearance between the pin 20 and the wall 38. Thus when the shift fork 16 translates, the depressed pin 20 will not engage the walls 38, 40 and therefore will not prevent movement of the shift fork 16.

As shown in FIG. 1, control tube 14 has a plurality of cams 44 and the shift fork 16 has a pair of tabs 46, 48. When the control tube 14 is rotated so the ramp 34 aligns with and depresses the pin 20, thereby enabling translation of the shift fork 16, a cam 44 simultaneously aligns with the tabs 46, 48 on the shift fork 16 which is selected for movement by the operator by rotating the control tube 14. Thus, when the operator translates the control tube 14, the cam 44 engages a tab 46, 48 and causes the shift fork 16 to translate accordingly, and thereby move a synchronizer (not shown) to engage a gear (not shown) as is well known in the art. When the operator translates the control tube 14 in the opposite axial direction, the cam 44 engages the opposite tab 46, 48, causing the shift fork 16 to translate therewith.

FIGS. 3–6 show views of the shift mechanism at a first shift fork 16, with the control tube 14 rotated from a first position, shown in FIGS. 3 and 4, to a second position shown in FIGS. 5 and 6. The control tube 14 in FIG. 3 is shown in a position where the shift fork 16 may be translated. FIGS. 5 and 6 show the same shift fork as shown in FIGS. 3–4, but the control tube has been rotated to a second position, wherein the ramp 34 is rotated and the pin 20 is projected outward radially by the spring 24. The pin 20 thus engages the shift fork 16 to prevent translation of the shift fork 16. In the position shown in FIG. 5 an aperture on the control tube 14 enables the pin 20 to project through the control tube 14 and engage the shift fork 16. As shown in FIG. 11, a plurality of apertures 42 are provided in the control tube 14. As shown in FIG. 2, the protruding pin 20 is engagably received by the shift fork 16 within a slot 36 provided in the shift fork 16 when an aperture 42 is aligned with the pin 18. When the pin 20 engages the shift fork 16, the walls of the slot 38, 40 prevent axial translation of the shift fork 16, because the pin 20 is engaged with the stationary shift rail 10, and therefore prevents axial movement of the shift fork 16 due to contact between the pin 20 and the walls of the slot 38, 40.

To release the shift fork 16 for translation, as shown in FIG. 1, the control tube 14 is rotated from the orientation in FIG. 5 to the orientation in FIG. 3, so the ramp 34 on the control tube 14 depresses the pin 20 radially inward into the hole 22, compressing the spring 24. FIG. 4 shows a side view of the fork in FIG. 3 as the control tube 14 is rotated to depress the pin 20 and release the shift fork 16.

To accommodate a second synchronizer, a second shift fork 116 is shown in FIG. 7 mounted at a second axial position on the control tube 14. The control tube 14 is shown in the same rotational position as shown in FIG. 3, but in the section shown at FIG. 7, the control tube has a second ramp 134 at a different angular position than that shown in FIG.

3. Thus when the control tube is positioned as shown in FIG. 3 where the first ramp 34 depresses the first pin 20 to release the first shift fork 16 for translation, the second ramp 134 at the second shift fork 116 is positioned away from the pin 120, and the pin 120 is no longer depressed by the second ramp 134 and therefore the pin 120 engages the second shift fork 116 to prevent translation of the second shift fork 116 as shown in FIG. 8.

FIG. 9 shows a sectional view the control tube 14 at the second shift fork 116 rotated from the position shown in FIGS. 3 and 7 to the position shown in FIG. 5. While the first ramp 34 is rotated to release the first pin 20 as shown in FIG. 5, the second ramp 134 is rotated from the position shown in FIG. 7 to the position shown in FIG. 9, wherein the second pin 120 is depressed by the second ramp 134, and the second shift fork 116 is permitted to translate.

Figure 15:
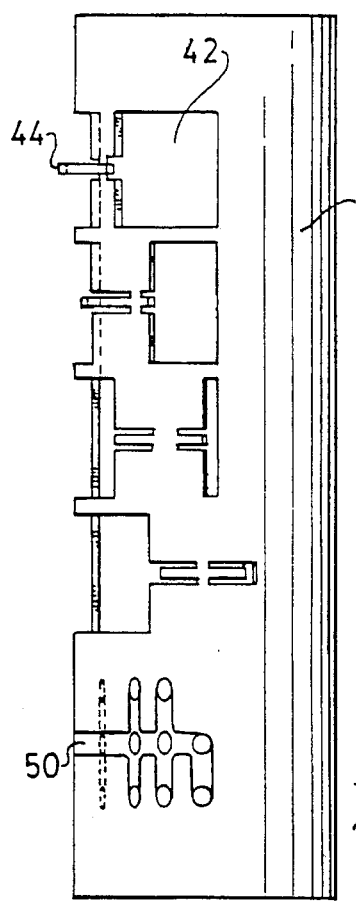
FIG. 15 is a side view of the control tube of FIG. 11, after the control tube is rolled.
Figure 16:
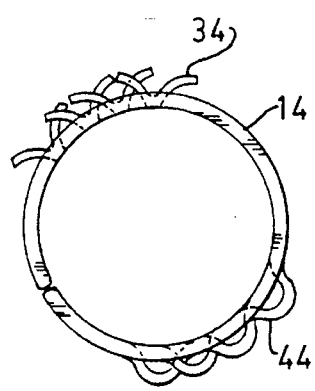
FIG. 16 is an end view of the control tube of FIG. 15.

In the preferred embodiment, the control tube 14 is formed from sheet metal, as shown in FIGS. 11–15. As shown in FIG. 11, the control tube is initially blanked, then punched to produce apertures 42, and formed to generate ramps 34, cams 44, grooves 52, and detents 54 as shown in FIGS. 11–14. The sheet metal is then rolled as is well known in the art to create the tube as shown in FIGS. 15 and 16. Alternatively, the control tube could also be formed by other known means, such as molded plastic, formed plastic sheets, or cast metal or other molded materials.

Figure 19:
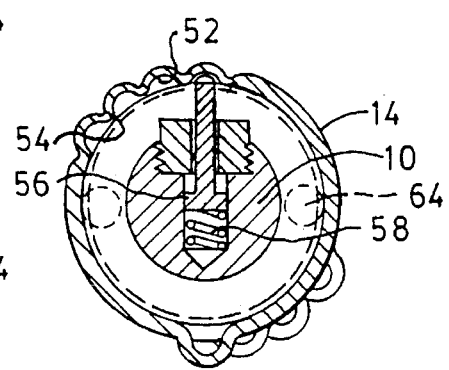
FIG. 19 is a sectional end view of the shift rail of FIG. 1 after assembly with a control tube and pin assembly, taken through the detent pin.

In the preferred embodiment, the control tube has a shift control means which includes a shift control pattern 50 shown generally in FIG. 11. The control pattern comprises a plurality of "H" shaped grooves 52 which include detents 54. The grooves 52 guide the control tube over a control pin 56 provided on the shift rail 10, shown in FIG. 19. When the control tube 14 is rotated or translated, the control pin 56 moves along the grooves 52 the shift control pattern 50, thereby guiding and controlling the engagement and disengagement of the pins 20 with the shift forks 16 in a controlled manner. Within the grooves 52 are detents 54 with which the control pin 56 is engaged when the control tube is moved to a predetermined position, as shown in FIG. 19. Thus, when the control tube 14 is moved to a position corresponding with first gear, the control pin 56 engages a detent 54 corresponding with first gear, resisting movement into first gear. The effort and notchiness felt by the operator while changing gears may be easily modified by substituting a control spring 58 with a greater or lesser spring ratio. The effort and feel may also be modified by changing the shape of the detent 54 to provide a greater or lesser ramp angle or a deeper or shallower detent 54. Each detent 54 may be individually modified to make selection of individual gears more or less difficult. For example, it may be desirable to have a higher effort to shift into first gear. To accomplish this, the detent 54 corresponding to first gear could be made deeper or have a greater ramp angle than other detents 54.

The above described shift control system prevents the control tube 14 from being translated when a shift fork 16 is not engaged by a cam 44 on the control tube as shown in FIG. 2, which could otherwise result in the control tube 14 being moved to a position to select a gear, but the proper shift fork 16 would not be moved, because the proper pin 20 would not be depressed by the ramp 34. Additionally, the grooves 52 prevent the control tube 14 from rotating when a shift fork 16 has been translated. This prevents movement of more than one shift fork 16 at a time, thereby preventing damage to the transmission. Alternatively, the shift control pattern 50 could be include slots in place of the H-shaped grooves 52 in the control tube, while the shift rail 10 could have a fixed pin (not shown) which projects through the groove 52. However, this alternative design would reduce the ability to adjust shift efforts with the detents 54 as described above.

As shown in FIG. 19, the control pin 56 in the preferred embodiment is identical to the pins 20 for engaging the shift forks 16 as described above, which reduces the complexity and number of parts in the assembly. As described above, balls or other projections could be substituted for the pin. Alternatively, the shift control system could be provided by other means, such as those discussed in U.S. Pat. Nos. 5,309,782 and 5,291,799 to Seaman, or any other means as known in the art, many of which control the shift lever (not shown), which adds to variability as discussed in Seaman.

In the preferred embodiment, the shift forks 16 are carried on a single rail 10, which provides for identical shift forks 16. Thus, the present design could easily be modified to accommodate a smaller or larger number of shift forks 16 by adding or deleting a shift fork 16 and pin assembly 18, extending the shift rail 10 and control tube 14, plus modifying the ramps 34, cams 44, apertures 42, and shift control pattern 50 on the control tube 14.

Figure 17:
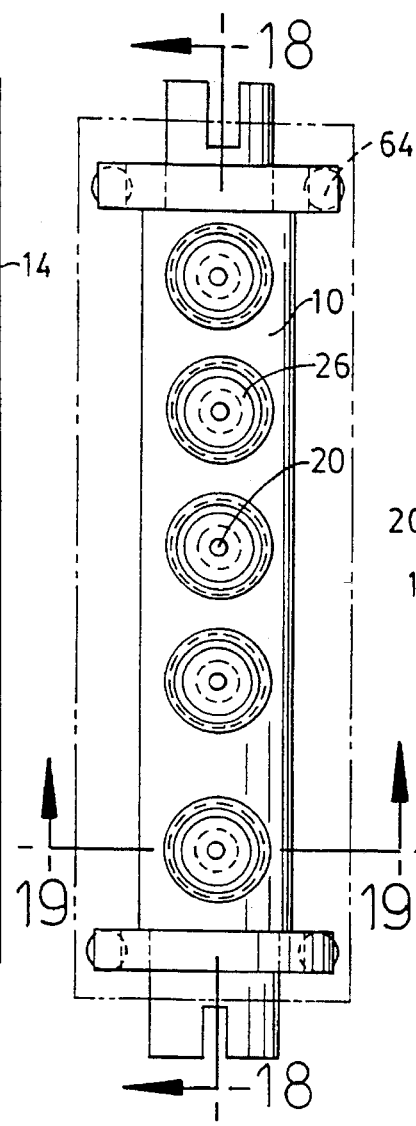
FIG. 17 is a plan view of the shift rail of FIG. 1.

In the preferred embodiment, the control tube 14 is supported on the shift rail 10 by bearings 64 as shown in FIGS. 17 and 18. One skilled in the art could easily substitute bushings for the bearings 64, or slide the control tube 14 directly on the outer surface of the shift rail 10.

In the preferred embodiment, the control tube 14 rotates 14.5 degrees to align a ramp 34 with a pin 20 for each shift fork 16 selected. This angle may be easily modified by one skilled in the art to suit the conditions encountered. Additionally, the spring rate and ramp angles are easily modified to change shift efforts to accommodate driver preferences for a particular transmission application.

The transmission in the preferred embodiment has three shift forks 16 to provide for a total of five forward speeds and one reverse speed. It is anticipated that one skilled in the art could easily modify the preferred embodiment and add or delete shift forks to change the number of gears supported by this invention.

FIGS. 20 and 21 show an alternate embodiment to the means for preventing translation of said shift forks 216 and means for disabling said means for preventing translation of said shift fork 216. In this alternative embodiment, a shift rail 210 is provided with a plurality of radial holes 222 through the shift rail 210. A pin 220 is provided in said hole 222, and said pin 220 protrudes from said shift rail 210. A control tube 214 is coaxial with said shift rail 210. The control tube 214 has a plurality of ramps 234 which depress a first end of the pin 223 to eliminate projection of the first end of said pin 223. As said pin 220 is depressed at said first end 223, a second, opposite end 225 of the pin 220 is caused to protrude from said shift rail 210 at a radially opposite location from said first end 223. The control tube 214 has an arcuate formation 244, which allows the second end 225 of said pin 220 to project from the shift rail 210. As the control tube 220 is rotated, the arcuate formation 244 pushes the pin at the second end 225, causing the pin 220 to project at the first end 223, which is possible because the ramp 234 is simultaneously rotated out of alignment with the first end 223 of the pin 220. Alternatively, a spring 224 could be provided to urge the pin 220 to project from the shift rail, as discussed in the preferred embodiment. Additionally, the arcuate formation 244 serves to translate the shift fork 216 by engaging a tab 246, 248 on the shift fork 216 and causes the shift fork 216 to translate accordingly, and thereby move a synchronizer (not shown) to engage a gear (not shown) as discussed in the preferred embodiment.

Another alternate embodiment of the present invention would enable rotation and translation of the shift rail 10 and fixes the control tube 14 against rotation and translation. Alternatively, the shift rail 10 is fixed against rotation and permitted to translate, or permitted to rotate and fixed against translation. In these embodiments, the control tube 14 is free to move where the shift rail 10 is fixed.

Although the preferred embodiment of the present invention has been disclosed, various changes and modifications may be made without departing from the scope of the invention as set forth in the appended claims.

I claim:

1. A multiple speed manual transmission shift mechanism mounted within a transmission housing, comprising:
   a shift rail, fixedly mounted within and supported by said transmission housing;
   a control tube coaxially disposed about said shift rail and slidably and rotatably supported by said shift rail;
   a plurality of shift forks supported for translation by said control tube;
   a means for translating said shift forks;
   a means for preventing translation of said shift forks; and
   a means for disabling said means for preventing translation of said shift forks.

2. The shift mechanism of claim 1, wherein said control tube is formed from sheet metal rolled to a tubular shape.

3. The shift mechanism of claim 1, wherein said control tube is formed from sheet metal which is blanked, then formed to provide a plurality of apertures, ramps and cams, then rolled to a tubular shape.

4. A multiple speed manual transmission shift mechanism mounted within a transmission housing, comprising:
   a shift rail, mounted within and supported by said transmission housing;
   a control tube coaxially disposed about said shift rail;
   a plurality of shift forks supported for translation by said control tube;
   a means for translating said shift forks, including a first surface on one of said shift forks adjacent said control tube, said surface having a tab projecting toward said control tube, and a second surface on said control tube adjacent said one shift fork, said second surface on said control tube having a cam, wherein said cam is rotatably alignable with said tab, whereby said cam causes said shift fork to translate when said control tube is translated;
   a means for preventing translation of said shift fork; and
   a means for disabling said means for preventing translation of said shift fork.

5. A multiple speed manual transmission shift mechanism mounted within a transmission housing, comprising:
   a shift rail, mounted within and supported by said transmission housing;
   a control tube coaxially disposed about said shift rail; a plurality of shift forks supported for translation by said control tube;
   a means for translating said shift forks;
   a means for preventing translation of said shift forks; and
   a means for disabling said means for preventing translation of said shift forks, including a surface on said control tube adjacent said shift rail, said surface having a ramp alignable and engagable with said means for preventing translation of said shift forks, whereby said ramp engages said means for preventing translation of said shift forks to disable said means for preventing translation of said shift forks.

6. A multiple speed manual transmission shift mechanism mounted within a transmission housing, comprising:
   a shift rail, mounted within and supported by said transmission housing;
   a control tube coaxially disposed about said shift rail;
   a plurality of shift forks supported for translation by said control tube;
   a means for translating said shift forks;
   a means for preventing translation of said shift forks, including said shift rail having a radial hole with a deflectable pin positioned in said radial hole, an aperture in said control tube, said aperture being alignable with said deflectable pin, and said shift forks having a surface adjacent said control tube, said surface having a slot, wherein each of said deflectable pins is selectably engagably received by a slot in one of said shift forks when said aperture in said control tube is aligned with said pin; and
   a means for disabling said means for preventing translation of said shift forks.

7. The shift mechanism of claim 6, wherein each of said deflectable pins comprises a pin, a means for retaining said pin to said shift rail, and a resilient means positioned between each of said pins and said shift rail, whereby each of said pins is caused to protrude from said shift rail.

8. The shift mechanism of claim 7, wherein said means for retaining said pins comprises:
   a flange disposed about the outer periphery of said pin;
   a collar having a bore, wherein said collar is mounted in said hole in said shift rail after said pin is installed, and said pin projects through said bore, whereby said flange is retained by said collar.

9. The shift mechanism of claim 8, wherein said collar is threadably engaged with said shift rail and said resilient means comprises a coil spring.

10. A multiple speed manual transmission shift mechanism mounted within a transmission housing, comprising:
    a shift rail, mounted within and supported by said transmission housing;
    a control tube, coaxial with said shift rail, said control tube being slidably and rotatably supported by said shift rail;
    a plurality of shift forks supported for translation by said control tube;
    a means for translating said shift forks;
    a means for preventing translation of said shift forks;
    a means for disabling said means for preventing translation of said shift forks; and
    a shift control means whereby only one shift fork is moved when the control tube is moved, said shift control means including said shift rail having a radial control hole, a control pin positioned in said radial control hole, and said control tube having a groove alignable with said control pin, wherein said control pin engages said groove, whereby the position of said control tube is guided to control movement of said control tube.

11. The shift mechanism of claim 10, wherein said shift control means further comprises a detent, said detent being engagable with said control pin, whereby movement of the control tube is resisted.

12. The shift mechanism of claim 11, wherein said control tube is formed from sheet metal which is blanked, then formed to provide a plurality of apertures, ramps and cams, then rolled to a tubular shape.

13. A multiple speed manual transmission shift mechanism mounted within a transmission housing, comprising:

a shift rail having an outer surface, said shift rail mounted within and supported by said transmission housing, said shift rail having a plurality of radial holes in said outer surface;

a plurality of springs, each of said springs being mounted in said radial holes;

a plurality of pins mounted in said radial holes adjacent said springs;

a control tube coaxially disposed about, and supported by said shift rail, said control tube having an outer surface with a plurality of cams projecting radially from said outer surface and a plurality of ramps, said ramps being selectively alignable with said pins to deflect said pins to compress said springs into said radial holes, and said control tube having a control groove and detent alignable with one of said radial holes, wherein said control tube is formed from sheet metal rolled to a tubular shape;

a plurality of shift forks supported for translation by said control tube, each of said shift forks having a surface adjacent said control tube with a tab projecting therefrom, wherein said cams are selectively alignable with said tabs, whereby one of said shift forks is translated when said control tube is translated, said shift forks further having a second surface adjacent said control tube, said second surface having a slot therein, said slot being selectively engagable with said pins, whereby said shift fork is prevented from translation when said ramp on said shift tube is not aligned with said pin; and a control pin, said control pin being engaged with one of said radial holes wherein said control pin engages said control groove and detent in said control tube, whereby the position of said control tube is guided to control movement of said control tube so only one shift fork is moved when the control tube is moved and the movement of said control tube is resisted thereby.

* * * * *